A. P. NICHOLS.
ELECTRIC WATER HEATER AND STEAM GENERATOR.
APPLICATION FILED APR. 5, 1911. RENEWED JULY 10, 1913.
1,087,887.  Patented Feb. 17, 1914.
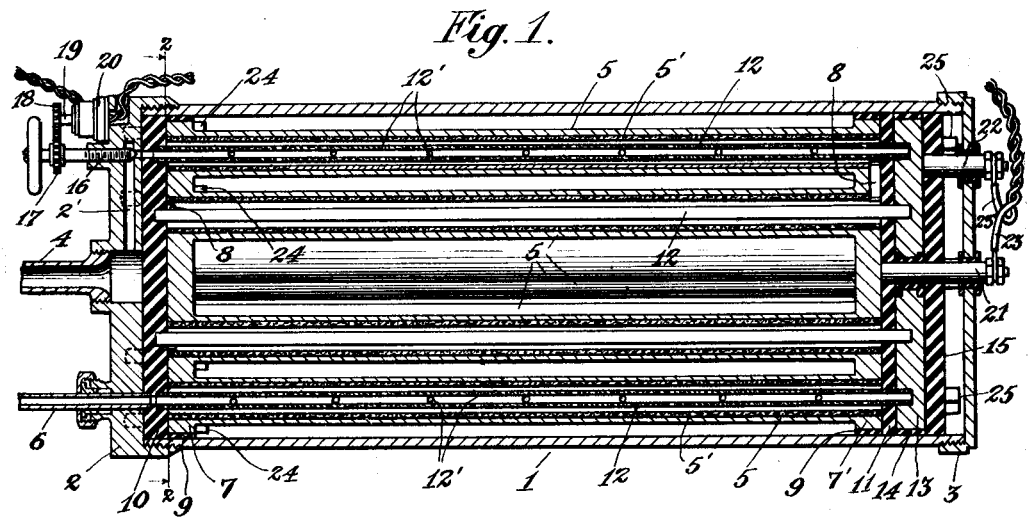
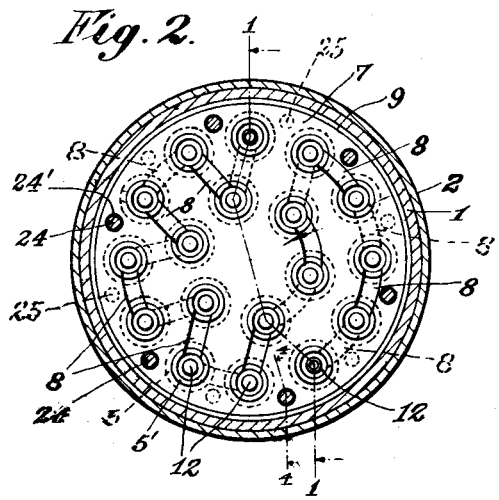
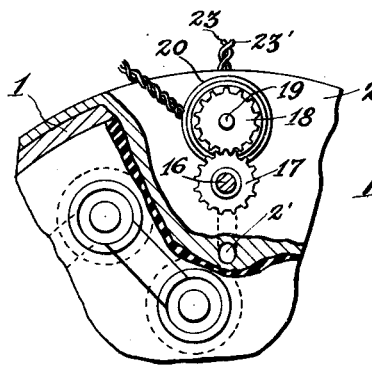
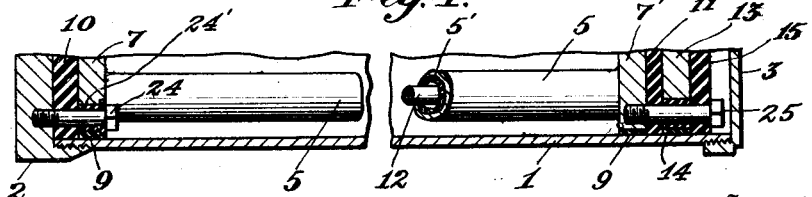
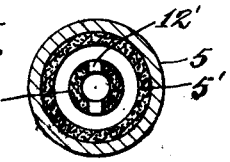
Witnesses
James E. Sproll.
Arleta Adams.
Inventor
Andrew P. Nichols.
By Adams & Brooks
Attorneys

UNITED STATES PATENT OFFICE.

ANDREW P. NICHOLS, OF SEATTLE, WASHINGTON.

ELECTRIC WATER-HEATER AND STEAM-GENERATOR.

1,087,887.  Specification of Letters Patent.  Patented Feb. 17, 1914.

Application filed April 5, 1911, Serial No. 619,174. Renewed July 10, 1913. Serial No. 778,419.

*To all whom it may concern:*

Be it known that I, ANDREW P. NICHOLS, a citizen of the United States of America, and a resident of the city of Seattle, in the county of King and State of Washington, have invented certain new and useful Improvements in Electric Water-Heaters and Steam-Generators, of which the following is a specification.

My invention relates to devices of the above type and has for a fundamental object to provide a simple, effective and compact arrangement of parts through the medium of which a stream of water can be heated with rapidity to the desired degree, my present apparatus being primarily adapted for the conversion of the water into steam.

A further object resides in the provision of a construction of this character including an extended heating surface so arranged that it occupies very little space and provides a channel of comparatively small cross sectional area for the water so that the latter flows therethrough in a thin sheet.

Other objects will be set forth as my description progresses and those features of construction, arrangements and combinations of parts on which I desire protection are succinctly defined in my annexed claims.

Referring to the accompanying drawings, wherein like numerals of reference indicate like parts throughout the several views; Figure 1 is a longitudinal section of my apparatus taken on line 1—1 of Fig. 2. Fig. 2 is an end elevation as viewed from the forward end of the apparatus, the end wall of the casing and the adjacent insulating sheet or disk being removed. Fig. 3 is a fragmentary end elevation with portions broken away. Fig. 4 is a fragmentary longitudinal section on large scale taken on line 4—4 of Fig. 2, and Fig. 5 is a transverse section of the intake section of the tortuous channel.

Referring to the drawing by numerals of reference 1 indicates a casing of any suitable material, provided with the removable covers or end walls 2 and 3, which latter are of any suitable material and preferably threaded on the opposite end portions of casing 1.

Leading to casing 1 is an inlet pipe 4 for supplying water under pressure thereto, and arranged within the casing in communication with pipe 4 is a tortuous channel which may be of any desired length to afford a heating surface of greater or less area for the water. This tortuous channel of casing 1, as now considered, is formed by a plurality of outer and inner conductors 5 and 12 respectively, the latter being of carbon, the former consisting of tubes of copper, brass or other suitable material, which are arranged lengthwise of casing 1 and connected at their opposite ends by conduits, as 8, arranged in staggered relation, each intermediate tube being connected at its ends with adjacent tubes on each side thereof, to provide a continuous path for the water, extending between intake pipe 4 and a suitable outlet pipe 6.

Conductors 5 which are preferably provided with cylindrical linings or electrodes 5' of conducting material, as carbon, are suitably secured in and extend through heads 7 and 7', of conducting material, and abutting insulating members 10 and 11 which extend over the outer faces of said heads 7, 7'. Heads 7, 7' and insulating members 10 and 11 preferably have snug fit in casing 1, said heads being insulated from the casing by insulating rings 9.

Conductors or electrodes 12 are fixed to a conducting head 13, insulated from casing 1 by an insulating ring 14 and disk 15 and extend through conductors 5, being spaced from but lying in such proximity to the linings 5' that the water flows therebetween in a thin hollow sheet. The opposite end portions of these conductors or electrodes 12 are engaged in suitable seats formed in member 10, the seats for the two outer electrodes, which latter are perforated, as at 12', consisting of apertures communicating with outlet pipe 6 and with a conduit 2', respectively, said conduit 2' which is formed in end wall 2, extending into communication with inlet pipe 4 and provided with a suitable controlling valve 16.

Valve 16 is provided on its stem with a pinion 17 meshing with a similar gear 18, provided on the switch stem 19, of a suitable switch inclosed in a casing 20, supported on the casing end wall 2.

Reference numerals 21 and 22 indicate binding posts for the heads 7' and 13 respectively, with which the wires 23, 23', of the electrical circuit controlled by the switch in casing 20, are connected, the several sets of opposite electrodes being electrically connected in multiple.

In operation, through manipulation of valve 16 to admit water to casing 1, the electrical switch in casing 20 is operated to its closed position. The water enters the first conductor 5 through the apertures 12' of the inclosed electrode 12, then travels through the remaining conductors 5 or sections of the tortuous channel or passage, forming a conductor between the adjacent inner and outer electrodes of a pair when passing over their conducting surfaces, and finally discharging from the apertured electrode 12 of the last conductor 5, of the circulatory channel, into outlet pipe 6 for conducting the hot water or steam to the desired point, as for example, to different portions of a building or room.

Reference numeral 24 indicates screw bolts clamping head 7 to end wall 12, these passing through openings 24', of the head, provided with bushings of insulating material, and reference numeral 25 indicates screw bolts for clamping heads 7' and 13 together and insulated from said head 13, as more clearly shown in Fig. 4.

Various changes can be made in the structural parts and arrangements thereof without departing from the spirit of my invention as defined in my annexed claims.

Having thus described my invention, what I claim as new, and desire to secure by Letters Patent of the United States of America, is:

1. In a water heater, the combination of spaced heads of conducting material, a plurality of tubular electrodes connected in multiple with said heads, said heads being formed with passages in staggered relation whereby the said tubular electrodes are all connected each to each for the continuous passage of water therethrough, an electrode within each of the first mentioned electrodes and spaced therefrom comprising a second set of electrodes, and means to connect said second set of electrodes in multiple.

2. In apparatus of the character described, a casing provided in one end wall with an intake passage, a valve controlling said passage, said casing being provided with an outlet, spaced heads of conducting material insulated from said casing, hollow electrodes electrically connected with said heads and being joined at their end portions to provide a continuous channel in said casing for the fluid, other electrodes extending through said first named electrodes and through one of said heads, two of said last named electrodes being apertured, one of said two electrodes being connected with said intake passage of the casing and the other with the outlet of the casing, and a third head of conducting material electrically connected with the electrodes of the last named series and insulated from said first named heads.

3. In apparatus of the character described, a casing provided with intake and outlet passages, spaced heads of conducting material, hollow electrodes electrically connected with said heads, said heads being formed with passages connecting said electrodes to provide a continuous channel for the fluid, other electrodes extending through said first named electrodes in spaced relation thereto and through one of said heads, a third head electrically connected with said last named electrodes, two of said last named electrodes being apertured and each connected with a respective passage of said casing, a valve for controlling the intake passage of said casing, a switch, means electrically connecting said third head and one of said first named heads with said switch, and means connecting said switch and valve for simultaneous operation.

Signed at Seattle, Washington this 29 day of March 1911.

ANDREW P. NICHOLS.

Witnesses:
ROBERT C. BROWN,
ARLITA ADAMS.